(12) United States Patent
Wu et al.

(10) Patent No.: US 12,480,409 B2
(45) Date of Patent: Nov. 25, 2025

(54) BLADE PLATFORM, BLADE RING, IMPELLER DISK AND GAS TURBINE ENGINE

(71) Applicants: AECC Shanghai Commercial Aircraft Engine Manufacturing Co., Ltd., Shanghai (CN); AECC Commercial Aircraft Engine Co., Ltd., Shanghai (CN)

(72) Inventors: Zhiqing Wu, Shanghai (CN); Xiaofeng Lu, Shanghai (CN); Dongqing Yan, Shanghai (CN); Ben Jiang, Shanghai (CN); Jibao Li, Shanghai (CN); Zeyong Yin, Shanghai (CN); Hao Liu, Shanghai (CN)

(73) Assignees: AECC Shanghai Commercial Aircraft Engine Manufacturing Co., Ltd., Shanghai (CN); AECC Commercial Aircraft Engine Co., Ltd., Shanghai (CN)

( * ) Notice: Subject to any disclaimer, the term of this patent is extended or adjusted under 35 U.S.C. 154(b) by 0 days.

(21) Appl. No.: 18/252,817

(22) PCT Filed: Nov. 18, 2021

(86) PCT No.: PCT/CN2021/131424
§ 371 (c)(1),
(2) Date: May 12, 2023

(87) PCT Pub. No.: WO2022/105823
PCT Pub. Date: May 27, 2022

(65) Prior Publication Data
US 2023/0417145 A1     Dec. 28, 2023

(30) Foreign Application Priority Data
Nov. 18, 2020 (CN) .......................... 202011292543.7

(51) Int. Cl.
*F01D 5/22* (2006.01)
*F01D 5/02* (2006.01)
(Continued)

(52) U.S. Cl.
CPC ............... *F01D 5/22* (2013.01); *F01D 5/027* (2013.01); *F01D 5/141* (2013.01); *F01D 5/30* (2013.01);
(Continued)

(58) Field of Classification Search
CPC . F01D 5/22; F01D 5/027; F01D 5/141; F01D 5/30; F04D 29/322; F05D 2240/80
See application file for complete search history.

(56) References Cited

U.S. PATENT DOCUMENTS 3,897,171 A     7/1975   Stahl
4,688,992 A  *  8/1987   Kirkpatrick ........... F01D 5/3038
                                                416/248
(Continued)

FOREIGN PATENT DOCUMENTS

CN     105473824 A    4/2016
CN     105814281 A    7/2016
(Continued)

OTHER PUBLICATIONS

International Search Report for International Application No. PCT/CN2021/131424, mailed May 27, 2022, 5 pages.
(Continued)

*Primary Examiner* — Andrew J Marien
(74) *Attorney, Agent, or Firm* — TraskBritt (57) ABSTRACT

A blade platform, comprising a pair of side edges and a pair of bottom edges, wherein the side edge comprises a linear portion and a curved portion, wherein the linear portion comprises a first linear portion and a second linear portion, and the curved portion comprises a first curved portion and
(Continued)

a second curved portion; wherein the first linear portion and the second linear portion are connected to two ends of the curved portion and are tangent to the curved portion, slopes of the first curved portion and the second curved portion are in the same direction and the first curved portion and the second curved portion are circumscribed. The benefits of the blade platform are that the problems of platforms pushing against each other and get stuck during the working state as in the prior art or lack of accuracy in the test results of the blade circumferential clearance test and the dynamic balance test can be avoided.

9 Claims, 11 Drawing Sheets (51) Int. Cl.
  *F01D 5/14* (2006.01)
  *F01D 5/30* (2006.01)
  *F04D 29/32* (2006.01)

(52) U.S. Cl.
  CPC ........ *F04D 29/322* (2013.01); *F05D 2240/80* (2013.01)

(56) References Cited

U.S. PATENT DOCUMENTS

| | | | | |
|---|---|---|---|---|
| 4,878,811 | A | 11/1989 | Jorgensen | |
| 5,242,270 | A * | 9/1993 | Partington | F01D 5/22 416/193 A |
| 8,657,579 | B2 * | 2/2014 | Reno | F01D 11/006 416/193 A |
| 8,961,135 | B2 * | 2/2015 | Beeck | F01D 11/003 416/193 A |
| 2003/0044282 | A1 * | 3/2003 | Zhu | F01D 5/143 416/193 A |
| 2007/0128021 | A1 | 6/2007 | Klasing et al. | |
| 2009/0304516 | A1 * | 12/2009 | Couch | F01D 25/12 416/223 A |
| 2010/0040460 | A1 | 2/2010 | Spangler et al. | |
| 2012/0051921 | A1 | 3/2012 | Reno | |
| 2012/0051930 | A1 * | 3/2012 | Pandey | F01D 5/145 416/223 A |
| 2013/0108448 | A1 * | 5/2013 | Ingram | F01D 5/143 29/889.7 |
| 2015/0075178 | A1 * | 3/2015 | Halfmann | F01D 5/22 29/889.7 |
| 2016/0177766 | A1 | 6/2016 | Rioux | |
| 2020/0080431 | A1 * | 3/2020 | Dhiwar | F01D 5/303 |
| 2020/0318488 | A1 | 10/2020 | Kamrath et al. | |

FOREIGN PATENT DOCUMENTS

| | | |
|---|---|---|
| CN | 106593545 A | 4/2017 |
| CN | 208546354 U | 2/2019 |
| CN | 112096653 A | 12/2020 |
| DE | 102016211344 A1 | 12/2017 |
| DE | 102016219837 A1 | 4/2018 |
| EP | 2808491 A1 | 3/2014 |
| JP | S5993901 A | 5/1984 |
| JP | 2011-074837 A | 4/2011 |
| JP | 201598848 A | 5/2015 |

OTHER PUBLICATIONS

International Written Opinion for International Application No. PCT/CN2021/131424, mailed May 27, 2022, 4 pages.
Chinese First Office Action for Chinese Application No. 2020112925437, dated Nov. 18, 2020, 1 page.
European Supplemental Search Report for European Application No. EP21893970, dated Apr. 4, 2024, 14 pages.
Chinese First Office Action for Chinese Application No. 202011292543.7, dated Dec. 25, 2020, 10 pages with translation.
Chinese Notice of Allowance for Chinese Application No. 202011292543.7, dated Dec. 30, 2020, 3 pages with translation.
International Search Report for International Application No. PCT/CN2021/131424, mailed Jan. 29, 2022, 8 pages (3 pages of English Translation and 5 pages of Original Document).
International Written Opinion for International Application No. PCT/CN2021/131424, mailed Jan. 29, 2022, 8 pages (4 pages of English Translation and 4 pages of Original Document).

* cited by examiner

BLADE PLATFORM, BLADE RING, IMPELLER DISK AND GAS TURBINE ENGINE

CROSS-REFERENCE TO RELATED APPLICATIONS

This application is a national phase entry under 35 U.S.C. § 371 of International Patent Application PCT/CN2021/131424, filed Nov. 18, 2021, designating the United States of America and published as International Patent Publication WO 2022/105823 A1 on May 27, 2022, which claims the benefit under Article 8 of the Patent Cooperation Treaty to Chinese Patent Application Serial No. 202011292543.7, filed Nov. 18, 2020.

TECHNICAL FIELD

Examples herein relate to the field of turbomachinery, in particular, to a blade platform, blade ring, impeller disk and gas turbine engine.

BACKGROUND

Figure 1:
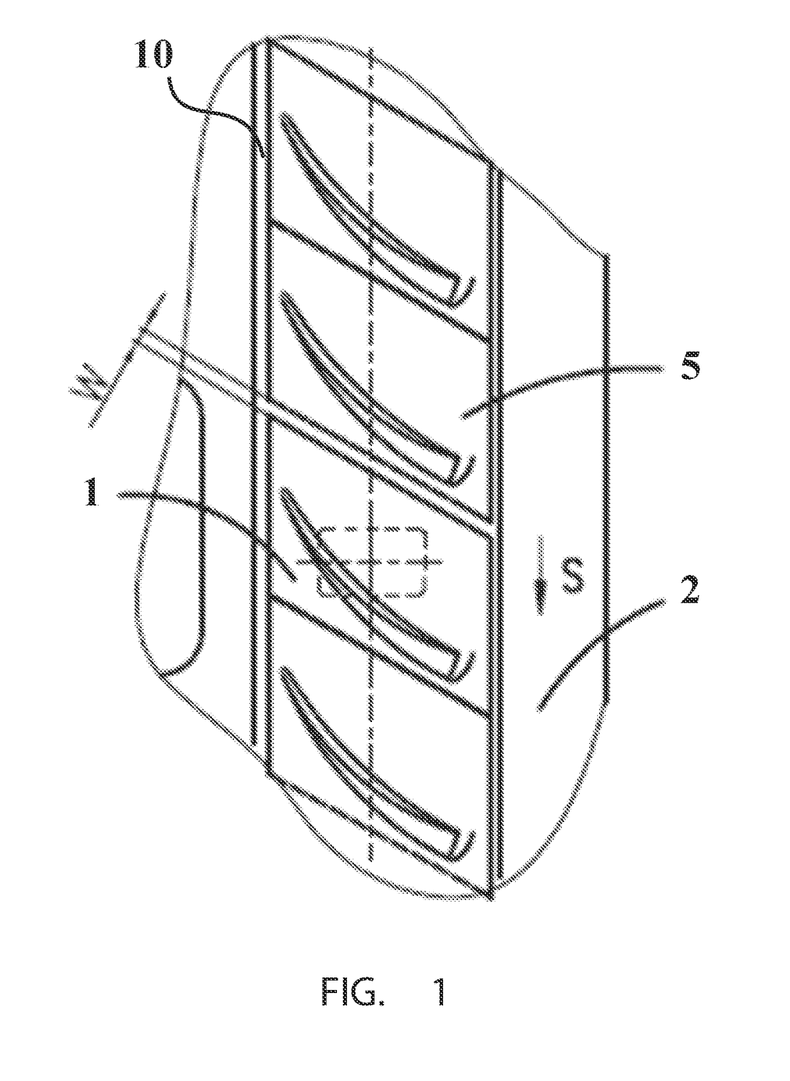
FIG. 1 is a partial schematic diagram of a blade ring in the prior art.
Figure 3:
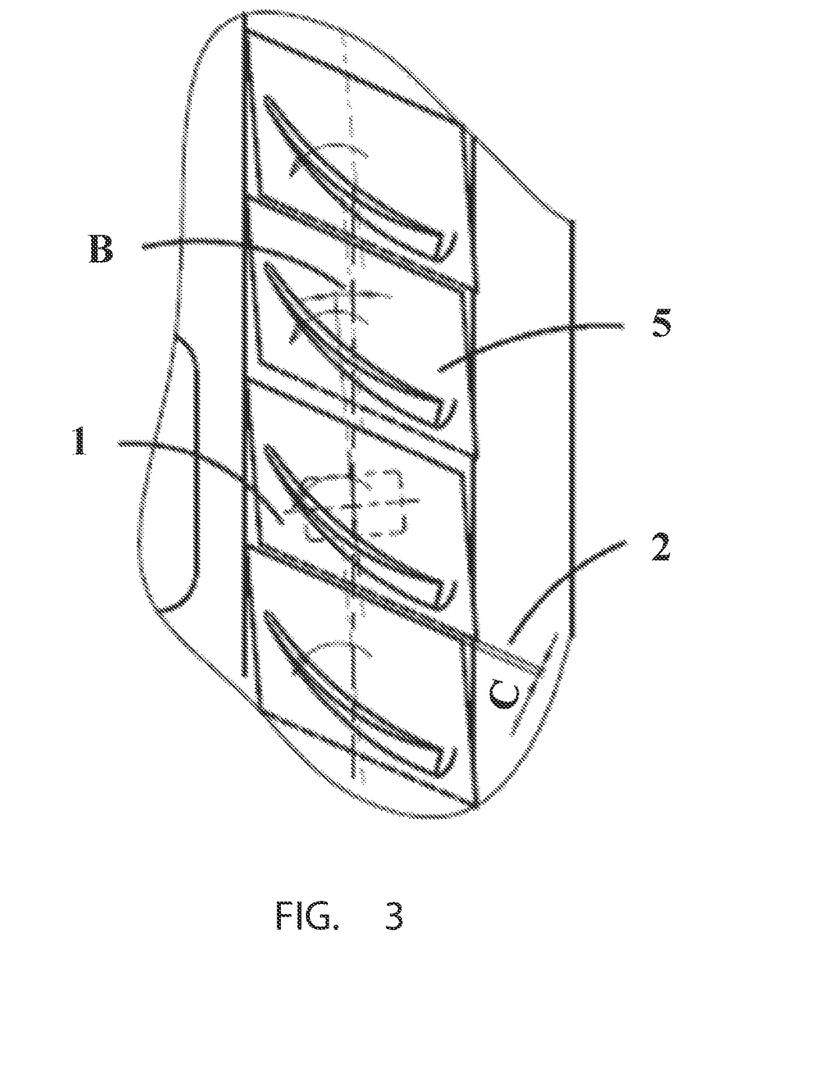
FIG. 3 and FIG. 4 are schematic diagrams of the blade ring of FIG. 1 under external force.
Figure 4:
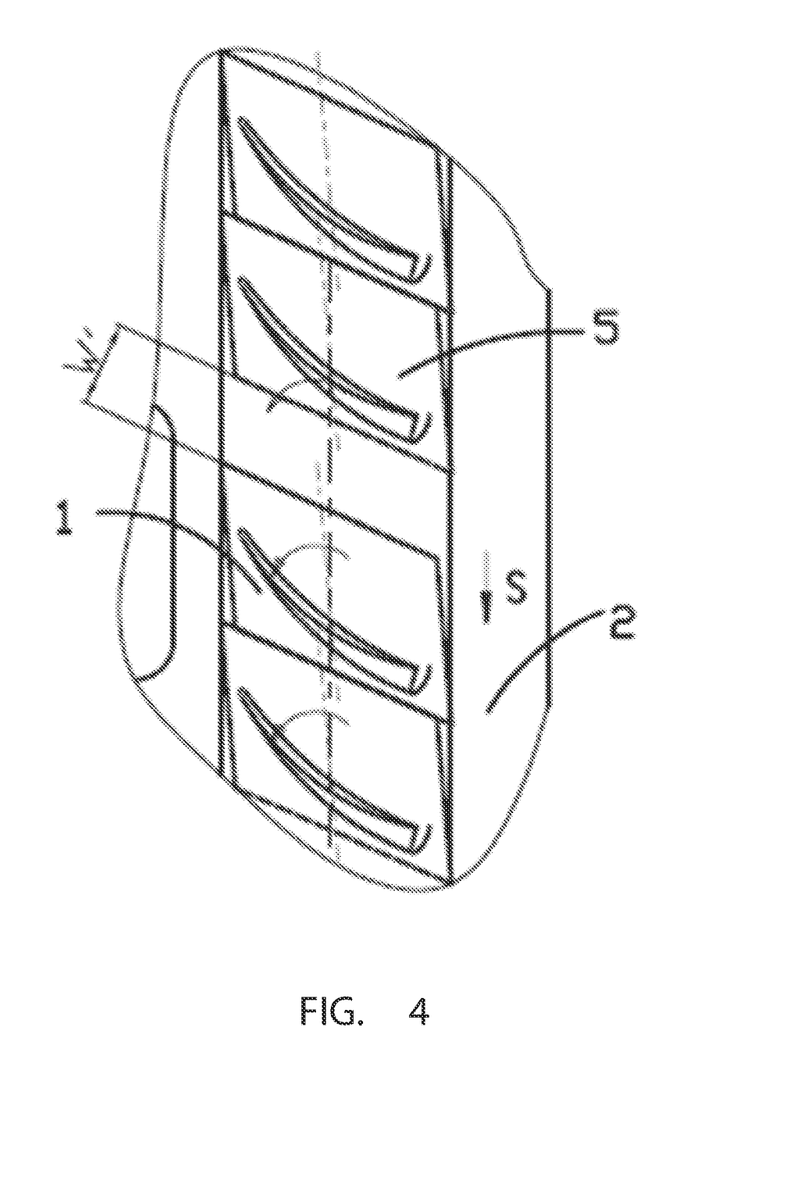
Figure 5:
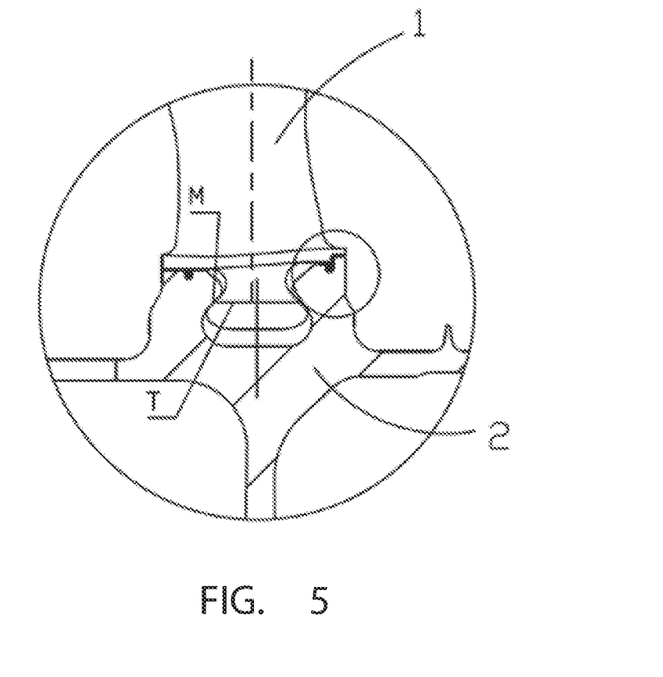
FIG. 5 and FIG. 6 are schematic diagrams of a blade and a blisk with protruded limiting structure provided on one side of the groove in the prior art.

Turbomachine, such as a high-pressure compressor of a gas turbine engine as shown in FIGS. 1-5, blades of a blade ring 10 can be mounted in a circumferential direction by putting fir-tree roots into grooves of a compressor disk 2, the reference position of the fir-tree root and the groove is a reference line T as shown in FIG. 5, a contact area M is provided between the fir-tree root and the groove, forming an impeller. The blade comprises a platform to adapt to the flow channel, where a certain circumferential clearance should be provided between the platforms of the blades during the operation of engine to ensure that the fir-tree root of the blade is attached to a working surface of the groove of the disk for load transmission due to the centrifugal force. The circumferential clearances of a plurality of blades on the blade ring 10 will accumulate; for example, as shown in FIG. 1, a designed circumferential clearance W is accumulated between a first blade platform 1 and a last blade platform 5, which are the two ends of the blade ring 10 in the circumferential direction.

Due to the requirements of the gas turbine engine for a high-efficiency and high-margin high-pressure compressor, more blades need to be provided, that is, the solidity of the blades needs to be improved, and the twist angle needs to be increased for improving the performance of the rotor blades. An inclined-edge platform structure is generally required for the blade platform with high solidity, large installation angle and fir-tree roots in the circumferential direction, such as the parallelogram structure shown in FIG. 1 and FIG. 2 and the platform structure shown in FIG. 2 where the angle $\alpha$ of the platform cannot be a 90° right-angle, so that enough blades can be mounted and the large installation angle can be achieved.

Figure 2:
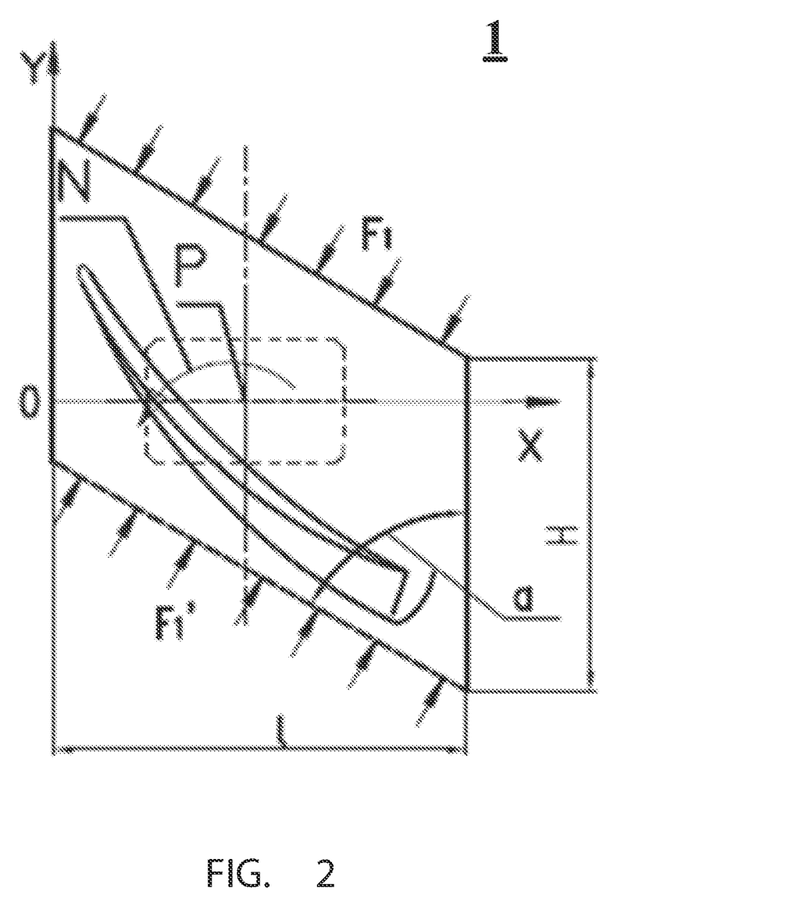
FIG. 2 is a schematic diagram of a blade platform in the prior art.

However, as shown in FIGS. 2-4, due to the inclined-edge platform provided, during the process of completing the present invention, it was found that under the action of external force, for example, when the rotor unbalance test is performed, the blade is twisted by a twist angle B, the adjacent blades are pushed against each other and a force couple N ($N=H*\cos \alpha*F$, where H is the width of the platform, $\alpha$ is the angle of the platform, F is the pushing force between the platforms of the adjacent blades) is generated relative to a center P of the fir-tree root, so that the blades will rotate around the center P of the fir-tree root, and a gap C is formed between the platforms of the adjacent blades. Since the platform is presented by a straight line with a constant gradient k ($k=\tan \alpha=$constant), the blade platforms would not interfere with each other after twisting, and can move in the same direction S, so that the circumferential clearance between the first blade platform 1 and the last blade platform 5 would increase to an actual circumferential clearance $W'=W+n*C$ (n is the number of blades).

Since the actual circumferential clearance $W'$ and the designed circumferential clearance W are different, the accuracy of measurement of circumferential clearance of the platform and dynamic balance and will be affected, for example, the residual dynamic unbalance of the rotor cannot be truly reflected by the rotor dynamic balance test, resulting in great potential safety hazards to the engine operation.

Therefore, in order to obtain a test structure that can truly reflect the dynamic unbalance of the rotor, one of the test methods in the prior art is to repair or replace by blades with different platform widths to eliminate the effect of the gap C, so that even if twisting occurs, it can be ensured that the actual circumferential clearance $W'$ is equal to the design circumferential clearance W. However, during the process of completing the present invention, it was found that this would lead to insufficient circumferential clearance W in actual operation of the blade ring 10, resulting in the adjacent blade platforms being pushed against each other, and the fir-tree root of the blade could not completely fit on the working surface of the disk groove, the platform is twisted angularly under the combined action of a centrifugal force and an aerodynamic force. Firstly, the contact between the fir-tree root of the blade and the groove changes from surface contact to point or line contact, which deteriorates the force applied on the disk groove; in the meantime, the installation angle of the blade is changed, resulting in the change of the flow area and affects the aerodynamic performance; with the increase in the rotational speed, the blade platforms are attached and pushed against each other and even get stuck under the high-temperature and high-pressure working environment, and the blade platforms are often stuck during disassembly, where a large external force will be required to knock the blade platform for loosening and then disassembling.

Figure 6:
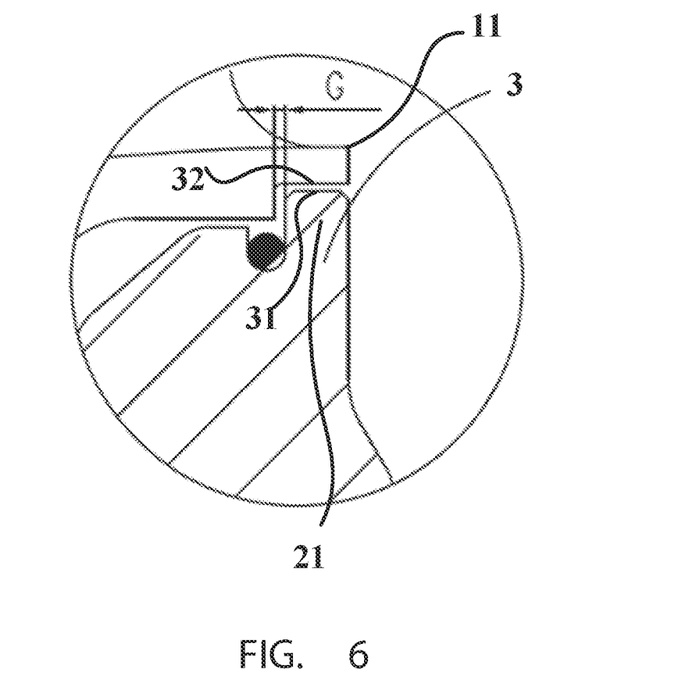
Figure 7:
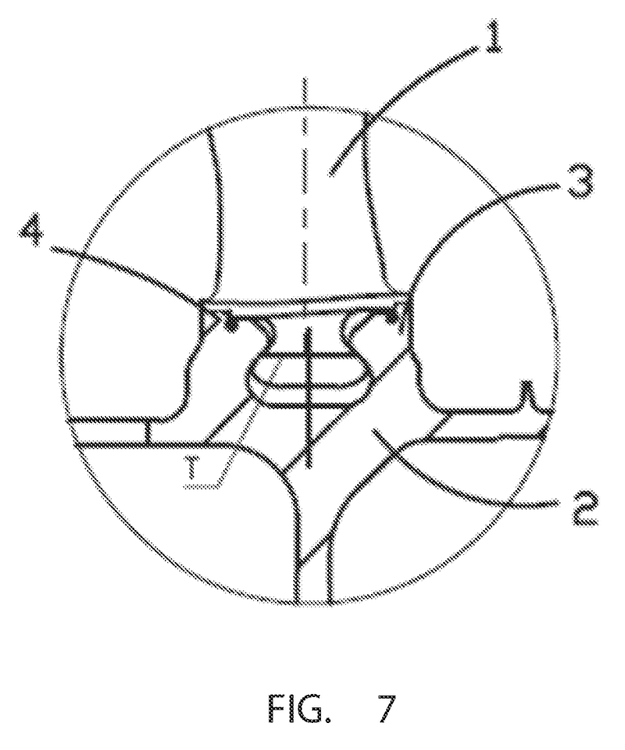
FIG. 7 is a schematic diagram of a blade and a blisk with protruded limiting structure provided on both sides of the groove in the prior art.

The solutions in the prior art further comprises a connection area between the compressor disk and the blade platform as shown in FIGS. 5-7, which is a protruded limiting structure provided on one side or both sides of an edge part of the blade platform or an edge part of the compressor disk, such as a first protruded limiting structure 3 formed by a first groove protruded part 31 provided on one side of an edge part of the groove 21 of the compressor disk and a first platform protruded part 32 provided on an edge part of the blade platform 11 as shown in FIG. 6, or a first protruded limiting structure 3 and a second protruded limiting structure 4 provided separately on both sides as shown in FIG. 7, and a gap G between the blade platform and the protruded part should be minimized as much as possible for limiting the angle of angular twist of blade. However, the actual circumferential clearance $W'$ and the designed circumferential clearance W are still different because of the gap G.

The solutions in the prior art also comprises an intermediate locking part and the structure provided between adjacent blade platforms for fastening connection, which makes the structure of the blade ring more complicated, and a high-strength intermediate locking part is required to ensure the reliability of the fastening connection.

Therefore, a blade structure is needed in the art, which can overcome the problems such as the insufficient accuracy of testing the circumferential clearance of the blades caused by the angular twist of the blades and the insufficient accuracy of the test results of the dynamic balance test, and also can prevent the platforms from pushing against each other and get stuck when the blade ring is in a working state, improving the stability and reliability of the compressor and the gas turbine engine.

BRIEF SUMMARY

One or more embodiments relate to providing blade platform.

One or more embodiments relate to providing blade ring.

One or more embodiments relate to providing an impeller disk.

One or more embodiments relate to providing a gas turbine engine.

One or more embodiments relate to a blade platform. The blade platform comprising a pair of side edges and a pair of bottom edges, wherein respective side edges of the pair of side edges comprises a linear portion and a curved portion, wherein the linear portion comprises a first linear portion and a second linear portion, and the curved portion comprises a first curved portion and a second curved portion; wherein the first linear portion and the second linear portion are connected to two ends of the curved portion and are tangent to the curved portion, slopes of the first curved portion and the second curved portion are in a same direction and the first curved portion and the second curved portion are circumscribed.

In one or more embodiments of the blade platform, the first curved portion is tangent to the first linear portion, and the second curved portion is tangent to the second linear portion.

In one or more embodiments of the blade platform, the first linear portion and the second linear portion are perpendicular to the pair of bottom edges and connected to respective ones of the pair of bottom edges.

In one or more embodiments of the blade platform, an edge portion of the blade platform and a body portion of the blade platform are in the same plane, forming a flat panel structure.

According to one aspect of the invention, a system, comprising a blade platform, the blade platform comprising a pair of side edges and a pair of bottom edges, wherein respective side edges of the pair of side edges comprise: a linear portion and a curved portion, wherein the linear portion comprises a first linear portion and a second linear portion, and the curved portion comprises a first curved portion and a second curved portion, wherein the first linear portion and the second linear portion are connected to two ends of the curved portion and are tangent to the curved portion, slopes of the first curved portion and the second curved portion are in a same direction and the first curved portion and the second curved portion are circumscribed; and a blade ring, the blade ring comprising a plurality of blades, each blade is provided with any one of the blade platform mentioned above, wherein respective side edges of the pair of side edges have a same structure, and the side edges of the blade platform of the adjacent blades have the same structure.

In one or more embodiments of the blade ring, the adjacent blades rotate by a same angle around the centers of their own tenon under the centrifugal force of the blade ring, such that the first curved portion and the second curved portion provided on the side edges of the adjacent blade platform are separated to form a non-contact structure, with a non-uniform gap between the non-contact structure, the first linear portion and the second linear portion provided on the side edges of the adjacent blade platform are attached for connection, without an intermediate locking part provided between the blade platforms at the two ends of the blade ring in the circumferential direction.

According to one aspect of the invention, the impeller disk comprising a blade ring and a blisk, with the blade ring and the blisk connected by a tongue-and-groove connection, wherein the blade ring is any one of the blade rings mentioned above.

In one or more embodiments of the impeller disk, an edge portion of the groove of the blisk and a body portion of the groove of the blisk are in the same plane.

According to one aspect of the invention, the gas turbine engine comprising a fan, a compressor and a turbine, wherein the fan and/or the compressor and/or the turbine includes any one of the impeller disks mentioned above.

In summary, the benefits of the invention include but are not limited to:

providing that the side edge is provided with the linear portion and the curved portion, the slopes of the first curved portion and the second curved portion are in the same direction and they are tangent to each other, when the blade rotates angularly around the center of the tenon P under an external force, since the slope of the curved portion varies at different positions, the gap between the adjacent platforms will not be uniform, resulting in moving of the adjacent blades along the same direction, so the adjacent platforms can only have a fixed angular position, thereby the actual circumferential clearance W' can be equivalent to the designed circumferential clearance W in the circumferential clearance test and the dynamic balance test, the problems of platforms pushing against each other and get stuck during the working state as in the prior art or lack of accuracy in the test results of the blade circumferential clearance test and the dynamic balance test can be avoided, and make sure that the tongue on the blade is tightly attached and pressed on the working surface of the groove of the disk for effective load transmission, the installation angle of the blade meets the design requirements, which ensures the requirements of high efficiency and high margin of the compressor in the gas turbine engine, thereby increasing the efficiency and safety margins of the gas turbine engine.

BRIEF DESCRIPTION OF THE DRAWINGS

The above and other features, properties and benefits of the present invention will become more apparent based on the following description combined with the accompanying drawings and embodiments. It should be noted that the drawings are only examples and are not drawn to scale, and they should not be taken as a limitation on the scope of protection actually claimed by the present invention, where:

DETAILED DESCRIPTION

The following discloses a variety of different embodiments or examples for implementing the technical solutions of the subject. In order to simplify the disclosure, specific embodiments of each element and arrangement are described below, which are, of course, only examples and do not intend to limit the scope of protection of the present disclosure. "One embodiment," "an embodiment," and/or "some embodiments" refer to a certain feature, structure, or characteristic associated with at least one embodiment of the present application. Therefore, it should be emphasized and noted that "an embodiment" or "one embodiment" or "an alternative embodiment" mentioned twice or more times in different places in this description are not necessarily referring to the same embodiment. Furthermore, certain features, structures, or characteristics in the one or more embodiments of the present disclosure may be combined as appropriate.

In the following embodiments, an impeller disk of a high-pressure compressor of a gas turbine engine is used as an example, but the disclosure is not limited to this embodiment. For example, embodiments herein may also be applied to a turbine disk of the gas turbine engine and even a fan disk, where the invention is also not limited to these embodiments, as long as the blade of the blade ring and the blade disk are connected by a fir-tree root and groove connection.

Figure 8:
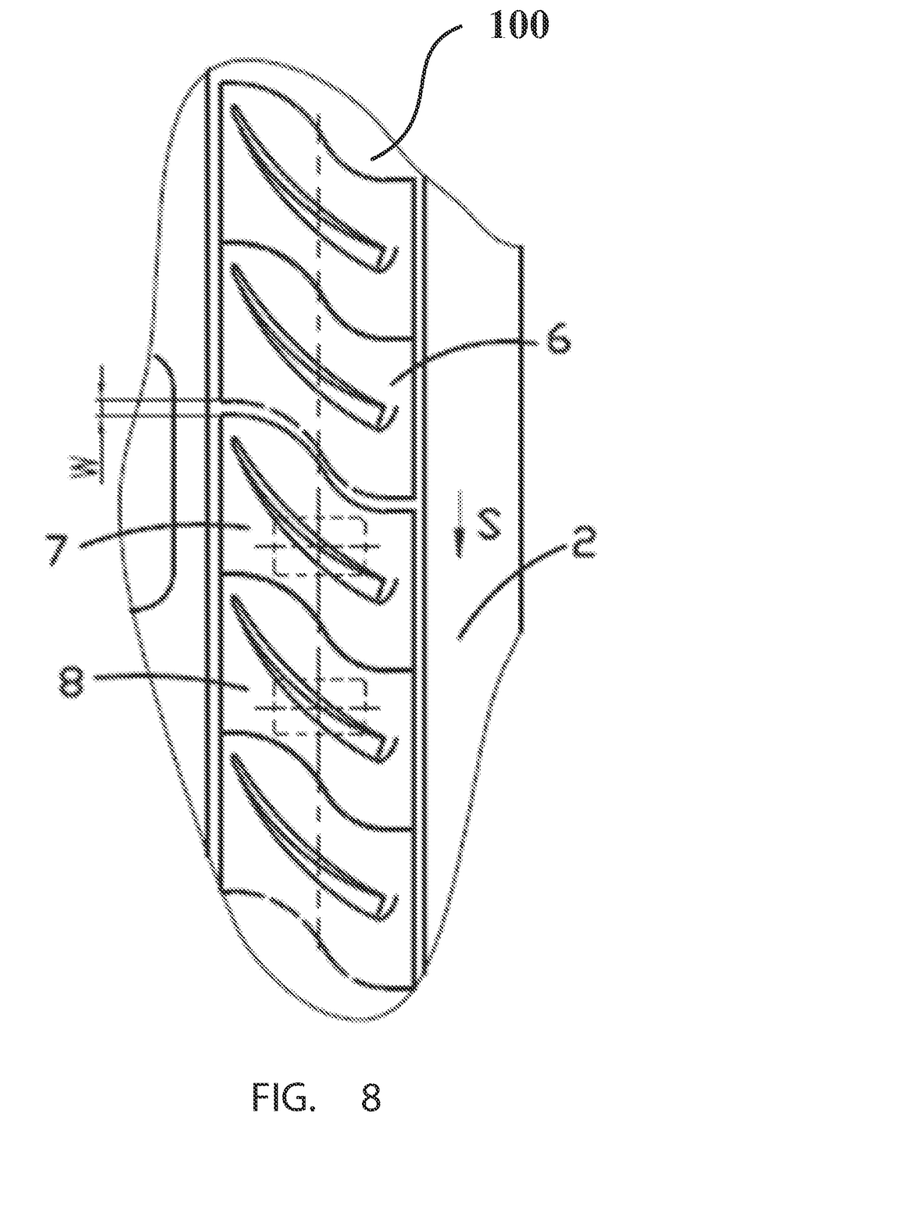
FIG. 8 is a partial schematic diagram of the blade ring in accordance with one or more embodiments.
Figure 9:
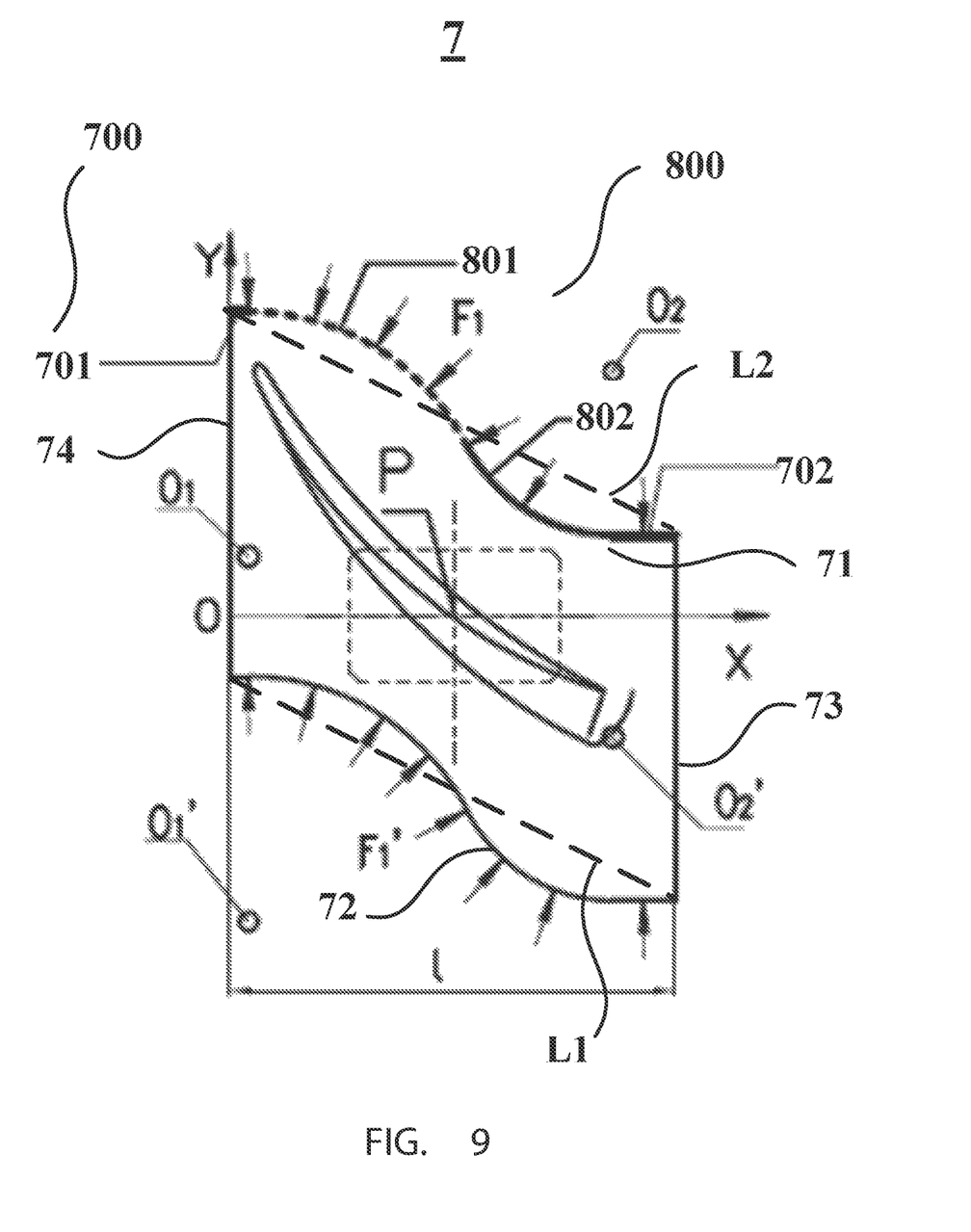
FIG. 9 is a schematic diagram of the blade of the blade ring of FIG. 8 in accordance with one or more embodiments.

As shown in FIGS. 8 and 9, in some embodiments, a blade ring 100 is mounted on a blisk 2 by a tongue-and-groove connection. The blade ring 100 comprises a plurality of blades, where the adjacent blade platforms are a first blade platform 7 and a second blade platform 8 as examples, and the blade platforms at both ends of the blade ring 100 in the circumferential direction are the first blade platform 7 and a third blade platform 6.

As shown in FIG. 9, the first blade platform 7, as an example, comprises a pair of side edges 71, 72 and a pair of bottom edges 73, 74, that is, a first side edge 71, a second side edge 72, a first bottom edge 73 and a second bottom edge 74. The first side edge 71, as an example, comprises a linear portion 700 and a curved portion 800, where the linear portion 700 comprises a first linear portion 701 and a second linear portion 702, and the curved portion 800 comprises a first curved portion 801 and a second curved portion 802, with the centers of a center of the first curved portion O1 and a center of the second curved portion O2 respectively; correspondingly, the centers of curved portions of the second side edge 72 are a center of a third curved portion O1' and a center of a fourth curved portion O2'. The compressive force exerted on the first side edge 71 by the adjacent blade platform is a first compressive force F1, the compressive force exerted on the second side edge 72 by the adjacent blade platform is a second compressive force F1', l is the length of the blade platform. The first linear portion 701 and the second linear portion 702 are connected to the two ends of the curved portion 800 and are tangent to the curved portion 800, for example, as shown in FIG. 9, the first linear portion 701 is connected and tangent to one end of the first curved portion 801, the second linear portion 702 is connected and tangent to one end of the second curved portion 802. The structure of the curved portion 800 is that the slopes of the first curved portion 801 and the second curved portion 802 are in the same direction, and the first curved portion 801 and the second curved portion 802 are circumscribed. The slopes of the first curved portion 801 and the second curved portion 802 are in the same direction is that:

$$k1=f(x)=(\text{Arc}1)\leq 0,\ k2=f(x)=(\text{Arc}2)\leq 0$$

or $$k1=f(x)=(\text{Arc}1)\leq 0,\ k2=f(x)=(\text{Arc}2)\geq 0$$

where Arc1 is the first curved portion 801, k1 is the slope of the first curved portion 801, Arc2 is the second curved portion 802 and k2 is the slope of the second curved portion 802.

Figure 10:
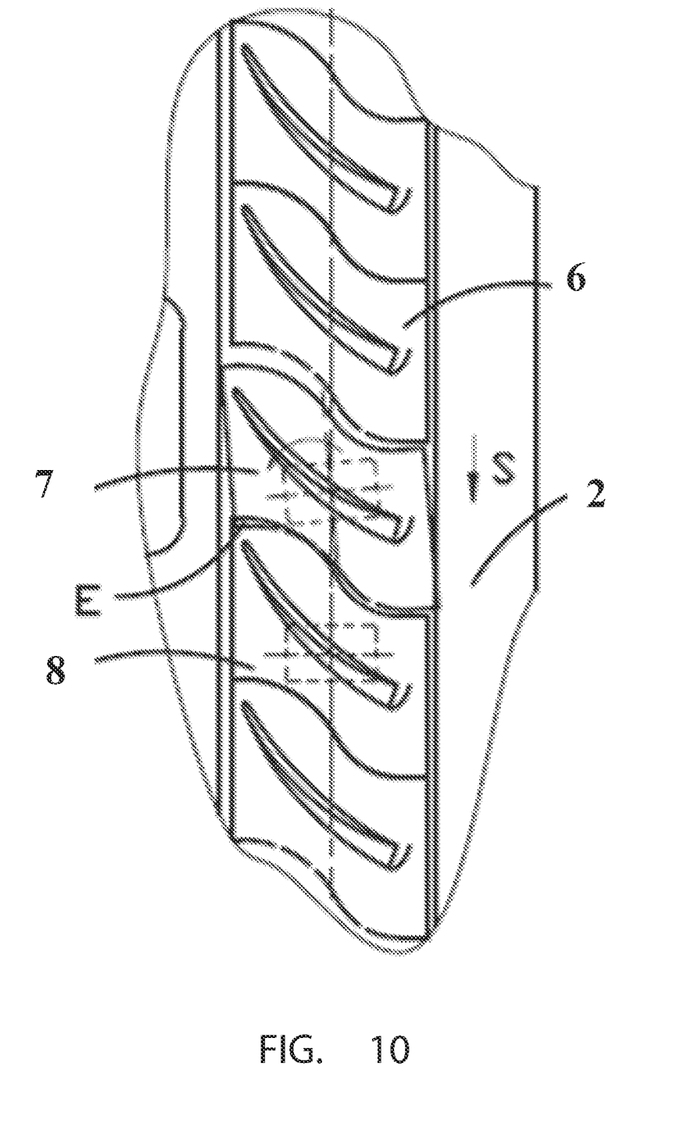
FIG. 10 and FIG. 11 are schematic diagrams of the blade of the blade ring of FIG. 8, in accordance with one or more embodiments.
Figure 11:
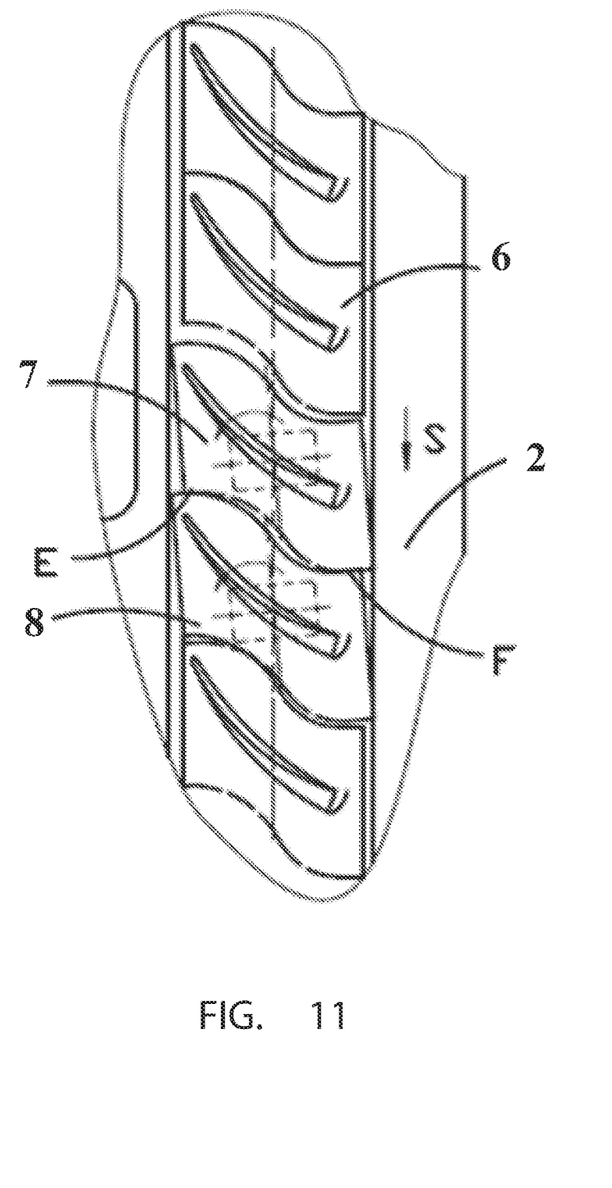

Referring to FIGS. 10 and 11, the benefits of the embodiments mentioned above is that the problem shown in FIGS. 3 and 4 where the actual circumferential clearance W' is different from the designed circumferential clearance W because of the inclined-edge platform with a parallelogram shape can be solved, so the problem of platforms pushing against each other and get stuck during a working state caused by repairing or replacing blades with different platform widths can be avoided, and make sure that the tongue on the blade is tightly attached and pressed on a working surface of the groove of the disk for effective load transmission, the installation angle of the blade meets the design requirements, which ensures the requirements of high efficiency and high margin of the compressor in the gas turbine engine, thereby increasing the efficiency and safety margins of the gas turbine engine. The intermediate locking part provided between the blade platforms at the two ends in the circumferential direction for fastening connection as the solutions in the prior art is not required, which can simplify the structure of the blade ring and reduce the manufacturing cost.

The principle of how the benefits mentioned above is achieved is shown in FIGS. 9-11, due to the centrifugal force of the blade ring, the adjacent first blade platform 7 and second blade platform 8 will rotate angularly by a same angle around the center of the tenon, so the first curved portion and the second curved portion provided on the side edges of the first blade platform 7 and the second blade platform 8 will be separated to form a non-contact structure. As the slope of the curved portion structure varies at different positions, when the curved portion of the first blade platform 7 rotates around the center of the tenon P, the curved portions of the adjacent first blade platform 7 and second blade platform 8 will be separated to form the non-contact structure. As the curved portions are provided, the gap between the non-contact structure of the adjacent first blade platform 7 and second blade platform 8 is not uniform, and the first linear portion and the second linear portion provided on the side edges of the first blade platform 7 and the second blade platform 8 are attached for connection, which are attached at position E and position F for connection as shown in FIGS. 10 and 11, so that the gap between the non-contact structure of the first blade platform 7 and the second blade platform 8 will not be uniform, resulting in moving of the first blade platform 7 and the second blade platform 8 along a same direction S as shown in FIGS. 3 and 4, thereby avoiding the difference in the actual circumferential clearance W' and the designed circumferential clearance W. Since angular torsion will not occur to accumulate a larger circumferential clearance, the intermediate locking part provided between the blade platforms at the two ends in the circumferential direction for fastening connection is not required.

Those skilled in the art can understand that the curved portion mentioned above should be understood in a broad sense, not limited to the narrow understanding as the arc shape shown in FIGS. 8-11, as long as the slope of the curved portion structure varies at different positions.

Continuing to refer to FIGS. 8-11, in one or more embodiments, the blade platform may have a specific structure where the first linear portion 701 and the second linear portion 702 of the linear portion 700 are perpendicular to the first bottom edge 73 and the second bottom edge 74 connected respectively, so the connection at position E and position F are more stable. Similar to the prior art, as shown in FIG. 9, the angles between the bottom edge and the connecting lines L1, L2 of the end points of the first bottom edge 73 and the second bottom edge 74 of the blade platform on the same side are acute angles, with the effect similar to the inclined-edge platform in the prior art, which improves the solidity of the blades and the installation angle. Continuing to refer to FIGS. 8-11, for a single blade of the blade ring 100, each side edge of a pair of side edges has the same structure, while for a plurality of blades, the side edges of each platform have the same structure, which simplifies the manufacturing process and reduces the difficultly in design.

Figure 12:
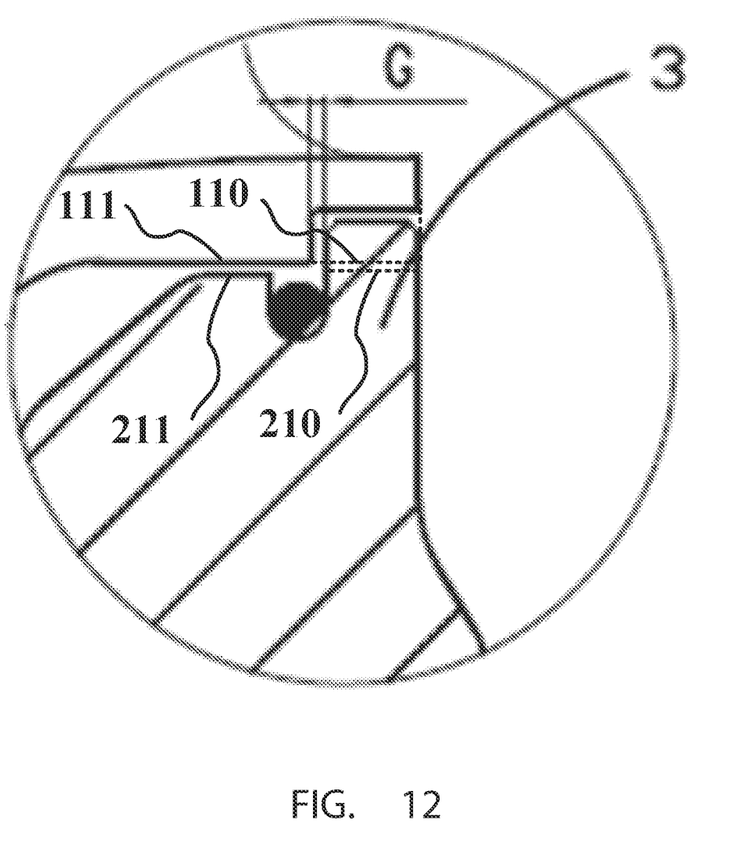
FIG. 12 is a schematic diagram comparing the tongue-and-groove connection structure of the blade and the blisk in accordance with one or more embodiments, and the prior art limiting structure of FIG. 6.

Referring to FIG. 6 and FIG. 12, in some embodiments, a protruded limiting structure as shown in FIG. 6 may not be necessary for the blade platform in the embodiment mentioned above, shown by the dash line in FIG. 12. Compared with FIG. 6, an edge portion of the blade platform 110 and a body portion of the blade platform 111 are in the same plane, so the blade platform is similar to a flat panel structure, and an edge portion of the groove 210 of the blisk 2 and a body portion of the groove 211 of the blisk 2 can also be in the same plane, so the manufacturing cost of the blade platform and the blisk can be reduced.

As can be seen from the above, in a rotor unbalance test, the rotor unbalance test can be directly performed on the impeller disk with the blade platform in the embodiment mentioned above. There is no need to perform the steps of repairing or replacing blades with different platform widths during the testing process as in the prior art to keep the actual circumferential clearance W' consistent with the designed circumferential clearance W, so using the impeller disk in the embodiment mentioned above to perform the rotor unbalance test can not only ensure accurate test results, but also simplify the test process.

In summary, the benefits of using the blade platform, the blade ring and the impeller disk provided in the embodiments mentioned above is that, providing that the side edge is provided with the linear portion and the curved portion, the slopes of the first curved portion and the second curved portion are in the same direction and they are tangent to each other, when the blade rotates angularly around the center of the tenon P under an external force, since the slope of the curved portion varies at different positions, the gap between the adjacent platforms will not be uniform, resulting in moving of the adjacent blades along the same direction, so the adjacent platforms can only have a fixed angular position, thereby the actual circumferential clearance W' can be equivalent to the designed circumferential clearance W in the circumferential clearance test and the dynamic balance test, the problems of platforms pushing against each other and get stuck during the working state as in the prior art or lack of accuracy in the test results of the blade circumferential clearance test and the dynamic balance test can be avoided, and make sure that the tongue on the blade is tightly attached and pressed on the working surface of the groove of the disk for effective load transmission, the installation angle of the blade meets the design requirements, which ensures the requirements of high efficiency and high margin of the compressor in the gas turbine engine, thereby increasing the efficiency and safety margins of the gas turbine engine.

Although various embodiments are mentioned above, use of embodiments is not intended to limit this disclosure to the specific embodiments mentioned, and any person skilled in the art can make possible changes and modifications without departing from the spirit and scope of the disclosure. Therefore, any modifications, equivalent changes and modifications made to the above embodiments according to the technical essence of the disclosure without departing from the content of the technical solutions of the disclosure all fall within the scope of protection defined by the claims that follow.

The invention claimed is:

1. A blade platform, the blade platform comprising a pair of side edges and a pair of bottom edges,
   wherein respective side edge of the pair of side edges comprises a linear portion and a curved portion, wherein the linear portion comprises a first linear portion and a second linear portion, and the curved portion comprises a first curved portion and a second curved portion,
   wherein the first linear portion and the second linear portion are connected to two ends of the curved portion and are tangent to the curved portion, slopes of the first curved portion and the second curved portion are in a same direction and the first curved portion is externally tangent to and connected to the second curved portion;
   wherein the blade platform is an inclined-edge platform and angle of the platform is not a 90° right-angle, wherein the angles between the bottom edge and connecting lines of end points of a first bottom edge and a second bottom edge of the inclined-edge platform on the same side are acute angles;
   wherein the first linear portion and the second linear portion are respectively located at two ends of the side edge and connected to adjacent side edges, and a center of the first curved portion and a center of the second curved portion are respectively located at two sides of the side edge;
   wherein the first linear portion and the second linear portion are perpendicular to the pair of bottom edges and connected to respective ones of the pair of bottom edges.

2. The blade platform of claim 1, wherein the first curved portion is tangent to the first linear portion, and the second curved portion is tangent to the second linear portion.

3. The blade platform of claim 1, wherein an edge portion of the blade platform and a body portion of the blade platform are in a same plane, forming a flat panel structure.

4. A system, comprising:
   a blade platform, the blade platform comprising a pair of side edges and a pair of bottom edges,
   wherein respective side edges of the pair of side edges comprise: a linear portion and a curved portion, wherein the linear portion comprises a first linear portion and a second linear portion, and the curved portion comprises a first curve portion and a second curved portion, wherein the first linear portion and the second linear portion are connected to two ends of the curved portion and are tangent to the curved portion, slopes of the first curved portion and the second curved portion are in a same direction and the first curved portion is externally tangent to and connected to the second curved portion; and a blade ring, the blade ring comprising a plurality of blades, each blade is provided with the blade platform, wherein respective side edges of the pair of side edges have a same structure, and the side edges of the blade platform of adjacent blades have the same structure;

wherein the blade platform is an inclined-edge platform and angle of the platform is not a 90° right-angle, wherein the angles between the bottom edge and connecting lines of end points of a first bottom edge and a second bottom edge of the inclined-edge platform on the same side are acute angles;

wherein the first linear portion and the second linear portion are respectively located at two ends of the side edge and connected to adjacent side edges, and a center of the first curved portion and a center of the second curved portion are respectively located at two sides of the side edge;

wherein the adjacent blades rotate by a same angle around the centers of their own tenon under a centrifugal force of the blade ring, such that the first curved portion and the second curved portion provided on the side edges of the adjacent blade platform are separated to form a non-contact structure, with a non-uniform gap between the non-contact structure, the first linear portion and the second linear portion provided on the side edges of the adjacent blade platform are attached for connection, without an intermediate locking part provided between the blade platforms at the two ends of the blade ring in a circumferential direction.

5. The system of claim 4, comprising an impeller disk, comprising the blade ring and a rotor, with the blade ring and the rotor connected by a tongue-and-groove connection.

6. The system of claim 5, wherein an edge portion of the groove of the rotor and a body portion of the groove of the rotor are in the same plane.

7. A system of claim 4, comprising:
a gas turbine engine, the gas turbine engine comprising a fan, a compressor and a turbine, wherein the fan and/or the compressor and/or the turbine includes an impeller disk.

8. The blade platform of claim 1, wherein respective slopes of the curved portion varies at different locations.

9. The blade platform of claim 1, wherein a gap between a non-contact structure of an adjacent first blade platform and second blade platform is not uniform.

* * * * *